United States Patent [19]
Haslett et al.

[11] Patent Number: 5,652,052
[45] Date of Patent: Jul. 29, 1997

[54] BI-COMPOSITE JOINT USING CONTINUOUS FIBER

[75] Inventors: Robert A. Haslett, Dix Hills; Willy A. Wolter, Huntington; Robert G. Micich, Bethpage, all of N.Y.

[73] Assignee: Northrop Grumman Corporation, Los Angeles, Calif.

[21] Appl. No.: 850,280

[22] Filed: Mar. 12, 1992

[51] Int. Cl.$^6$ .................. B32B 27/00; B32B 9/00; B32B 5/12

[52] U.S. Cl. .......... 442/253; 428/408; 428/105; 428/114

[58] Field of Search .................. 264/249, 282; 428/408, 272, 290, 105, 114; 427/282, 249; 423/447.2

Primary Examiner—George F. Lesmes
Assistant Examiner—Chris Raimund
Attorney, Agent, or Firm—Terry J. Anderson; Karl J. Hoch, Jr.

[57] ABSTRACT

A cloth employing graphite fibers may be subjected to different composite material formation processes so that three separate sections of heat capability may result across continuous fibers. Thus, one section may have optimum cold temperature strength while a removed section may have optimum high-temperature strength, with a transition section interceding. The existence of continuous fibers across these sections obviates the necessity for a mechanical joint thereby maximizing the reliability and performance characteristics of a resulting composite structure.

2 Claims, 1 Drawing Sheet

BI-COMPOSITE JOINT USING CONTINUOUS FIBER

FIELD OF THE INVENTION

The present invention relates to composite materials, and more particularly to a continuous joint for structures made of such materials.

BACKGROUND OF THE INVENTION

Rocket motors, jet engine nacelles, as well as other items require structural enclosures around a unit that undergoes transition from a cold to a hot section. Typically, different materials are used for different sections so a structure must have joints between assemblies constructed of dissimilar materials. Metals can sometimes be bi-brazed or fusion-welded together, but advanced composites require mechanical joints which are very heavy because of the low shear strength of high-temperature composite materials, such as carbon/carbon. Such mechanical joints must be sealed and leakage can cause catastrophic failure.

BRIEF DESCRIPTION OF THE PRESENT INVENTION

The present invention is a method for creating a single unit structure utilizing high and low temperature advanced composites that eliminate the weight penalty of a high-temperature mechanical joint and the risk of failure due to joint leakage.

The method of the present invention begins with the utilization of a woven 2-D or 3-D material employing conventional graphite fiber. Such materials are available from a host of manufacturers such as the Union Carbide Company. The finished structure of the present invention will include a zone or area which is subjected to relatively moderate temperatures while another zone is subjected to high temperatures such as 4,000° F. In the high-temperature area, the woven fiber is processed as conventional carbon/carbon by employing well-known techniques such as chemical vapor deposition, densification, and graphitization cycles. The portion of the structure to be used for low temperature service is masked during the carbon/carbon processing. Between the areas of high and low temperatures, a transition area is developed wherein this area is masked for some of the carbon/carbon processing cycles. The transition and low-temperature structural areas are impregnated with a low-temperature organic resin system such as epoxy or phenolic and are cured at low temperature.

A typical resulting product has the optimum strength/weight properties in both the low and high temperature areas. Further, high reliability and strength are realized for the continuous fiber re-enforcement between low and high temperatures areas, via the transition area. This presents advantageous design alternatives for end domes or other closures for rockets, and nacelles, which can be made with conventional techniques in the low-temperature end having reasonable shear strength properties.

Accordingly, with the present invention an advanced composite structure with transitions from low temperature to high temperature can be accommodated. In addition to rockets and nacelles already mentioned, the present method has application in the construction of rocket cases, hypersonic aircraft inlets, leading edges of control surfaces as well as aircraft nose structures. In addition, the invention is applicable to structural areas subjected to rocket or jet plume heating, and piping connections between hot and cold streams such as turbo pump mixers.

By virtue of the present invention, there is the elimination of heavy mechanical joints between different composite materials. The employment of a continuous fiber structure permits the present invention to further reduce structure weight by allowing use of optimum materials in different temperature environments. The elimination of a joint also eliminates potential leakage paths past joint seals. By eliminating joints there is an increase of service life and/or reliability by eliminating seals and fasteners.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
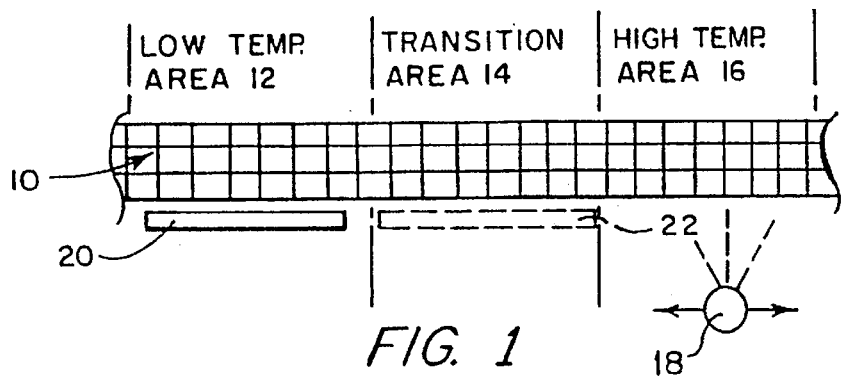
FIG. 1 is a schematic illustration of a continuous fiber woven structure, as employed in the present invention and which is prepared to accommodate hot and cold temperature areas, separated by a transition area.
Figure 3:
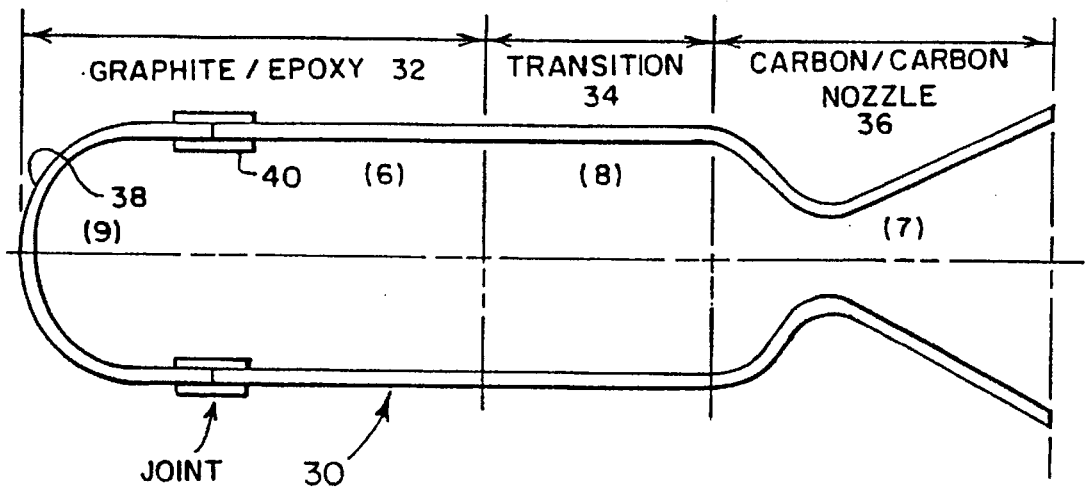
FIG. 3 is a schematic cross-sectional illustration of a rocket case/nozzle illustrating the separation of heat areas along the length of the illustrated structure.

Referring to the figures, and more particularly FIG. 1 thereof, reference numeral 10 indicates a fabric woven from a material, preferably graphite. The fibers of this preform are continuous across areas, 12, 14 and 16 and will remain so after formation of various thermal areas or zones, as will be explained hereinafter. The fibers will form the base of a composite structure, such as the rocket case/nozzle shown in FIG. 3, after the material has been treated to form composite sections. In the case of the rocket case/nozzle shown in FIG. 3, presented for illustrative purposes, the structural material in the nozzle area will be subjected to much higher temperatures than at an opposite end of the structure. Typically, rocket exhaust temperatures exceed 4,000° F. In accordance with the present invention, continuous fibers will extend through the various sections of the structure and this is schematically illustrated in FIG. 1 by the low-temperature area 12, high-temperature area 16, and transition area 14. The high-temperature area 16 corresponds to the nozzle section 36 while the low-temperature area 12 corresponds to the opposite end section 32 of the structure shown in FIG. 3. Thus, continuous graphite fibers extend between the high and low-temperature areas 16, 12 via the transition area 14.

Figure 2:
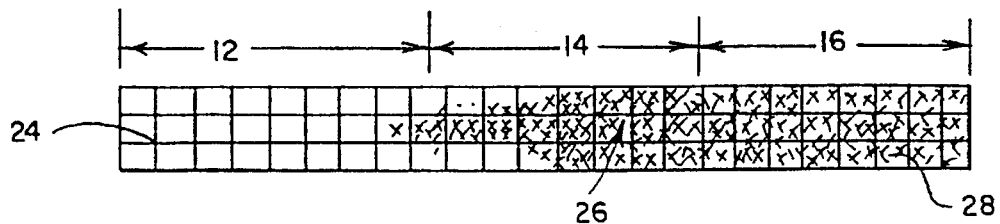
FIG. 2 is a schematic illustration indicating different composite materials developed across the three thermal areas of FIG. 2.

In order to form the continuous low, high, and transition composite areas shown in FIG. 2, it is necessary to create these areas as different composite sections of a continuous structure.

In a preferred embodiment of the present invention, the high-temperature area of the composite structure is formed as a carbon/carbon composite. The low-temperature area is formed as a graphite/epoxy composite, and the transition area 14 is likewise a graphite/epoxy composite with a carbon gradient that increases in density from the low-temperature area 12 to the high-temperature area 16. The following discussion will discuss a preferred means for forming the various composite areas utilizing the continuous graphite fibers throughout.

FIG. 1 schematically illustrates a conventional source of chemical vapor deposition 18 which causes densification and graphitization of the high-temperature area 16 in accordance with well-known composite fabrication techniques. Such deposition is generally accomplished after succeeding cycles. During these cycles the low-temperature area 12 remains masked (20) while the transition area 14 is selectively masked (22) for some of those cycles. The low-temperature area 12 is then impregnated with low-temperature resin, for example epoxy. Similar impregnation takes place in the material of the transition area 14. The temperature characteristics of the epoxy or other char-forming resin systems used in the low-temperature area 12 and transition area 14 may be different so that after curing the resultant composite material 24 in the low-temperature area 12 may be relatively free of carbon whereas the composite material in the transition area 14 may have a carbon gradient (26) produced therein having an increasing carbon density in the direction of the high-temperature area 16.

The end result after curing is the production of a carbon/carbon section 28 for the high-temperature area 16 while the low-temperature area 12 remains a relatively pure graphite/epoxy section. The transition area 14 will have a carbon content so that greatly different temperatures may be accommodated across the transition area without adversely affecting the structural integrity of the resulting structure.

FIG. 3 illustrates, by way of example, a rocket case/nozzle fabricated for the most part from continuous fiber sections and generally indicated by reference numeral 30, between the low-temperature graphite epoxy end section 32 and the carbon/carbon nozzle section 36 via a graphite/epoxy transition section 34.

In the particular structure illustrated in FIG. 3, it is necessary to have a removable cap to fill the rocket case. Accordingly, a detachable cover 38 is secured to the remainder of the rocket case by means of a suitable joint-seal 40.

Although the prior discussion mentions the utilization of graphite cloth as a basis for the three different temperature zones employing continuous fibers, lay-ups of such cloths having different fiber orientations such as multi-dimensional weaving may be employed to strengthen the resulting structure. However, in accordance with the present invention, each layer of such lay-ups would incorporate continuous fibers.

It should be understood that the invention is not limited to the exact details of construction shown and described herein for obvious modifications will occur to persons skilled in the art.

We claim:

1. A composite structure comprising:

a first carbon/carbon section at a first structure end for withstanding relatively high predetermined temperature;

a graphite/epoxy resin impregnated section at a second structure end for withstanding preselected temperatures lower than those of the first section; and a medial transition section between the first and second sections for withstanding temperatures between those of the first and second section;

the three sections having a composite fabric including continuous fibers extending through all three sections thereby creating a multi-section joint-free structure.

2. The composite structure set forth in claim 1 wherein the fabric comprises a plurality of lay-up layers, each of which has continuous fibers oriented in a preselected direction relative to adjacent layers.

* * * * *